Jan. 11, 1927. 1,614,304
G. T. JOHNSON
HOLLOW CHISEL MORTISER
Filed June 9, 1924  9 Sheets-Sheet 4

Jan. 11, 1927.

G. T. JOHNSON 1,614,304

HOLLOW CHISEL MORTISER

Filed June 9, 1924     9 Sheets-Sheet 7

Jan. 11, 1927.

G. T. JOHNSON 1,614,304

HOLLOW CHISEL MORTISER

Filed June 9, 1924   9 Sheets-Sheet 8

INVENTOR

Patented Jan. 11, 1927.

1,614,304

UNITED STATES PATENT OFFICE.

GUSTAVE T. JOHNSON, OF CINCINNATI, OHIO, ASSIGNOR TO J. A. FAY & EGAN COMPANY, OF CINCINNATI, OHIO, A CORPORATION OF WEST VIRGINIA.

HOLLOW-CHISEL MORTISER.

Application filed June 9, 1924. Serial No. 718,705.

My invention relates to hollow-chisel mortisers in the wood working art.

It is the object of my invention to provide new and improved means for causing feeding movement of the hollow-chisel ram; further, to provide novel means for feeding movement of the hollow-chisel ram and adjustments for depths of movement of the same with return of the ram to similar initial positions regardless of such adjustments; further, to provide novel means for adjusting the position of feeding movement of the hollow-chisel ram; further, to provide novel means whereby to return the ram to initial positions; further, to provide novel means for repetitions of feeding movements of the hollow-chisel ram; and, further, to provide novel means for backing out the hollow-chisel.

The invention will be further readily understood from the following description and claims, and from the drawings, in which latter:

The machine comprises a ram 31, which is arranged to have reciprocatory motion imparted thereto for moving the tool thereon into the wood and to retract the same therefrom. The tool in the present instance is exemplified as a hollow-chisel 32, in which an auger 33 is arranged to rotate, the chisel and the auger being so mounted as to move axially with the ram. Means are also provided for rotating the auger.

Figure 4:
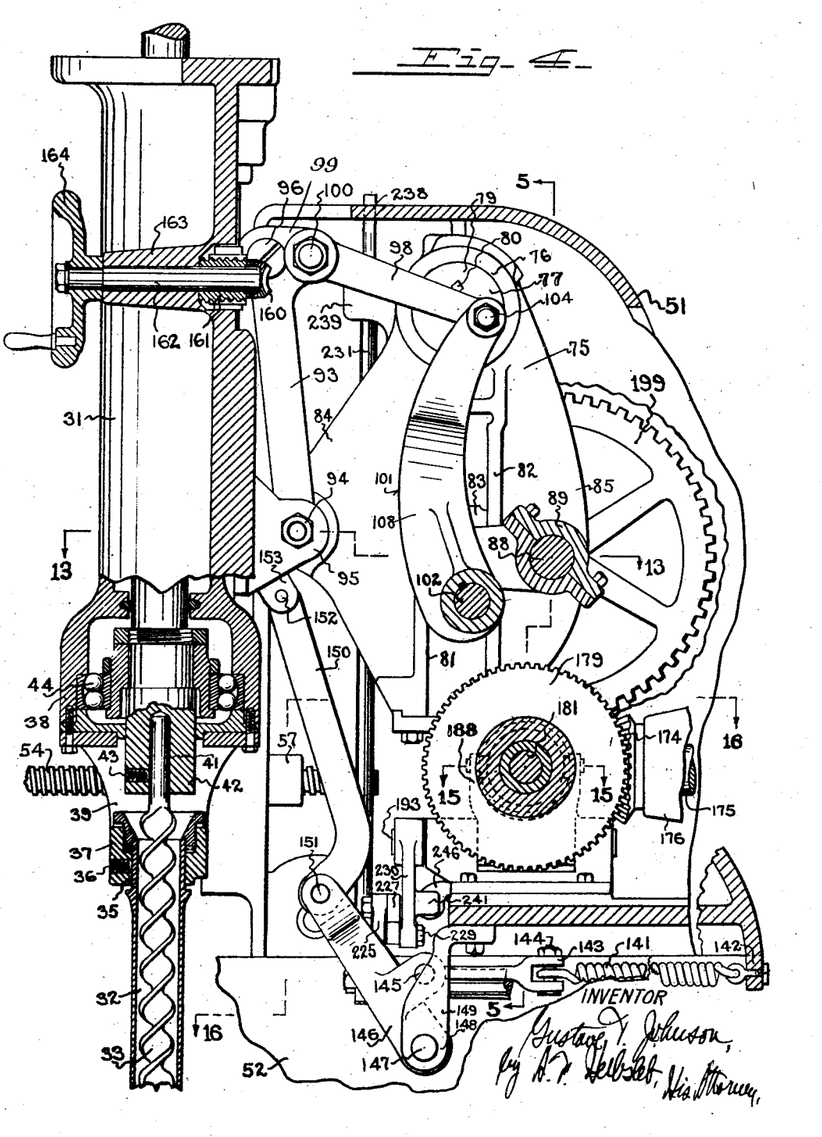
Fig. 4 is a vertical cross-section taken in the plane of the line 4—4 of Fig. 3, partly broken away, showing the hollow-chisel and lower bearing in axial section.
Figure 5:
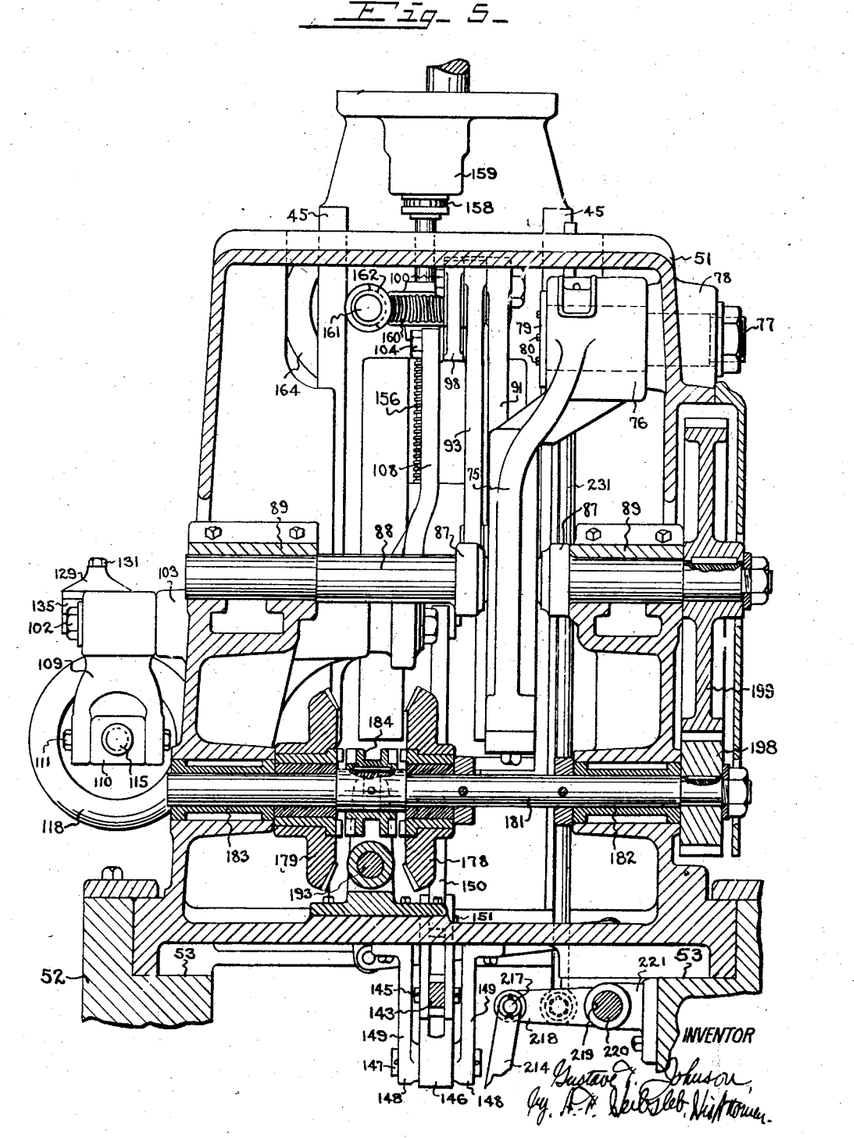
Fig. 5 is a cross-section taken in the plane of the irregular line 5—5 of Fig. 4.
Figures 7, 8, 9, 10, 11, 12:
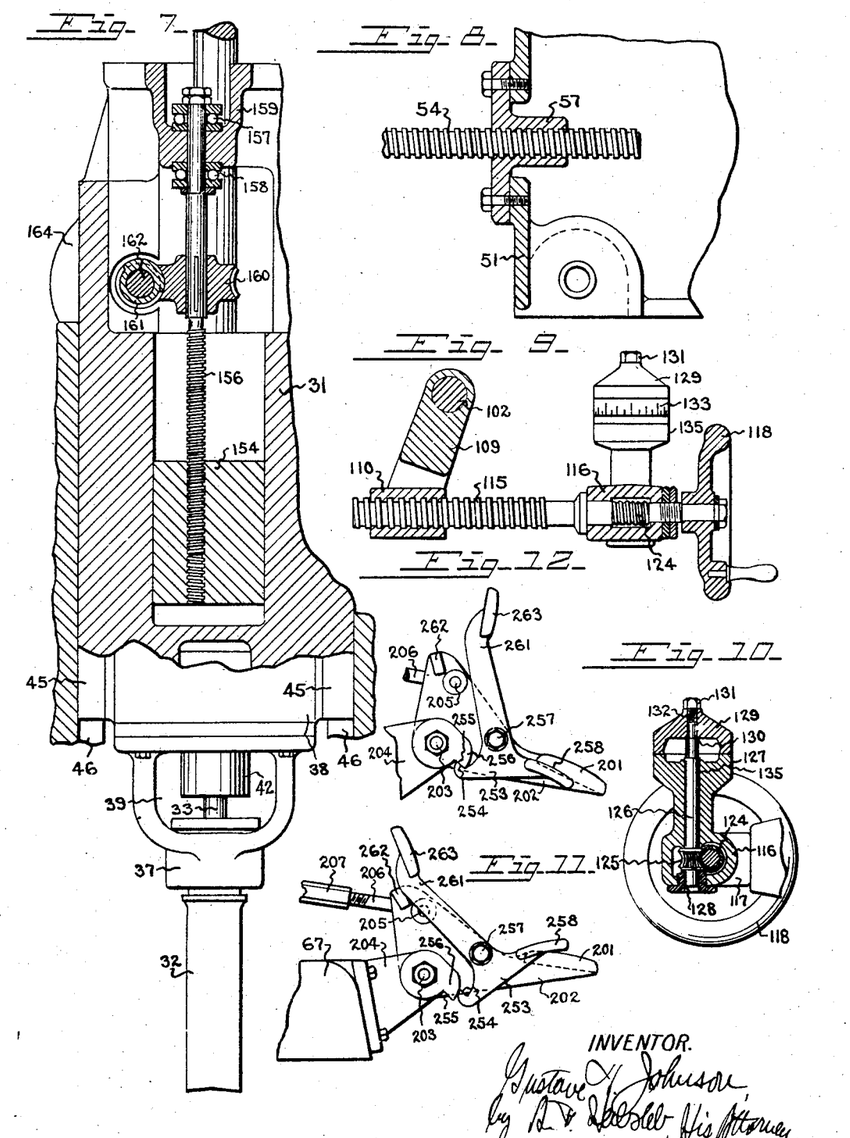
Fig. 7 is a detail taken in section on the line 7—7 of Fig. 3, showing the means for adjusting the position of the ram.
Fig. 8 is a detail taken in section on the line 8—8 of Fig. 3, showing the means for adjusting the supplemental frame.
Fig. 9 is a detail taken in section on the line 9—9 of Fig. 3, showing the means for adjusting the stroke of the tool.
Fig. 10 is a cross-section of the same, taken in section on the line 10—10 of Fig. 3.
Fig. 11 is a detail in side elevation showing the treadle means in release relation.
Fig. 12 is a similar view, showing the treadle in latched relation.
Figure 13:
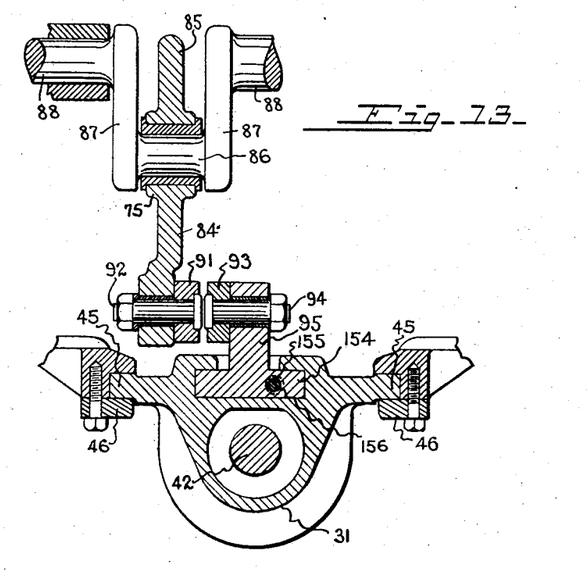
Fig. 13 is a cross-section, taken in the plane of the irregular line 13—13 of Fig. 4, showing the link means for reciprocating the ram.

The chisel is secured in a socket 35, as by means of a set-screw 36, the socket being in a socket-piece 37, secured to a bearing-housing 38 of the ram 31. (See Figs. 1, 4 and 7.) Clearance openings 39 are located in the socket-piece, through which the shaving and chips caused by the cutting of the hollow-chisel and of the auger pass. The auger is secured in a socket 41, in the end of an auger-spindle 42, being held therein by a set-screw 43, the auger-spindle being journaled in suitable bearings in the bearing-housing, one of which is shown at 44 as a radial and end-thrust ball-bearing. The ram is provided with guides 45 operating in guideways 46 on the machine. The auger-spindle may be suitably rotated, exemplified as accomplished by an electric motor 47 mounted on the ram.

The ram is suitably mounted on the frame, exemplified in the present instance as comprising a supplemental frame 51 adjustable on the main frame 52 on guides 53, which adjustment is accomplished by a screw-rod 54 journaled and held in endwise relation in a bearing 55 on a bracket 56 on the main frame, and having threaded connection in a threaded bearing 57 (see Figs. 1, 2, 3, 5 and 8), secured to the supplemental frame.

Figure 1:
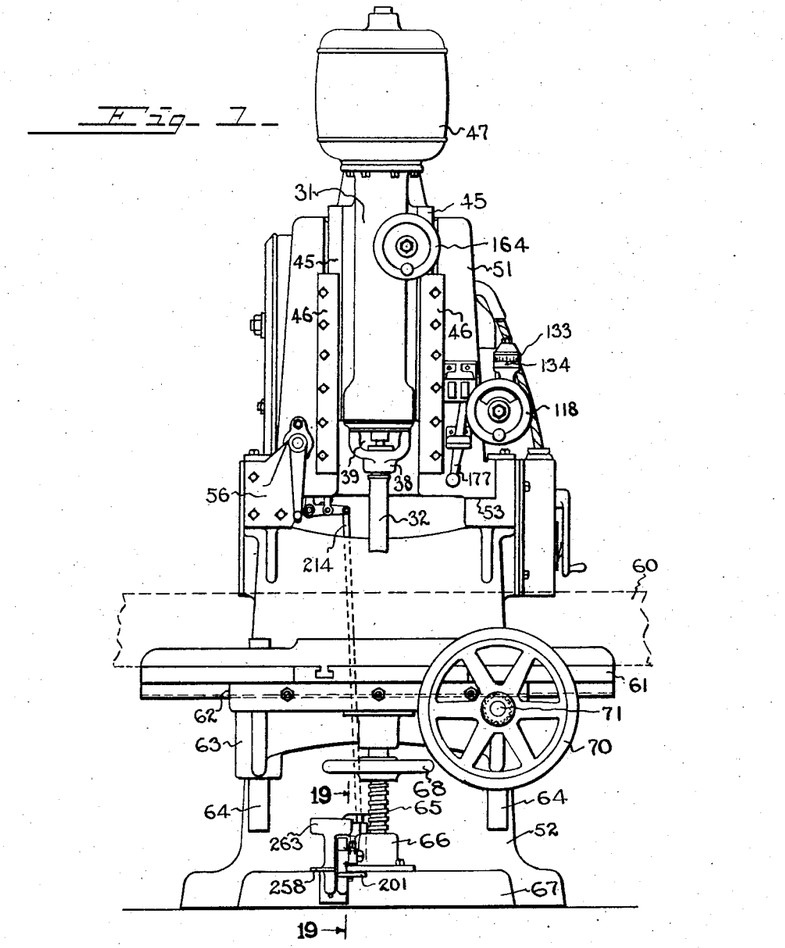
Fig. 1 is a front elevation of my improved device.
Figure 2:
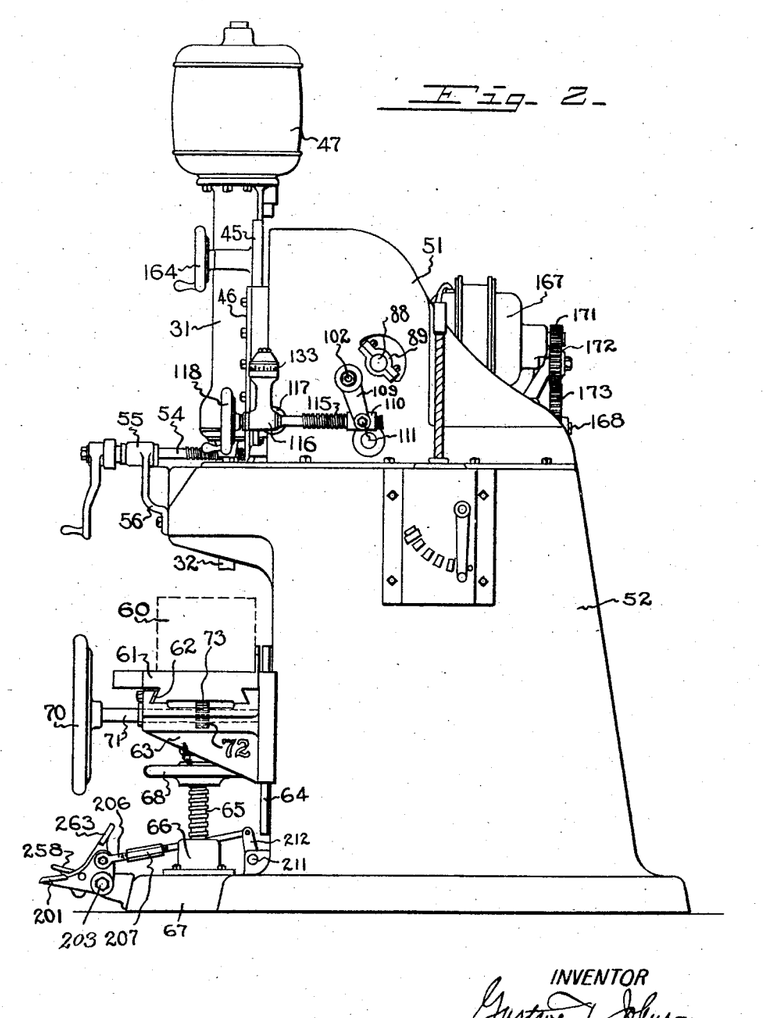
Fig. 2 is a side elevation of the same.
Figure 3:
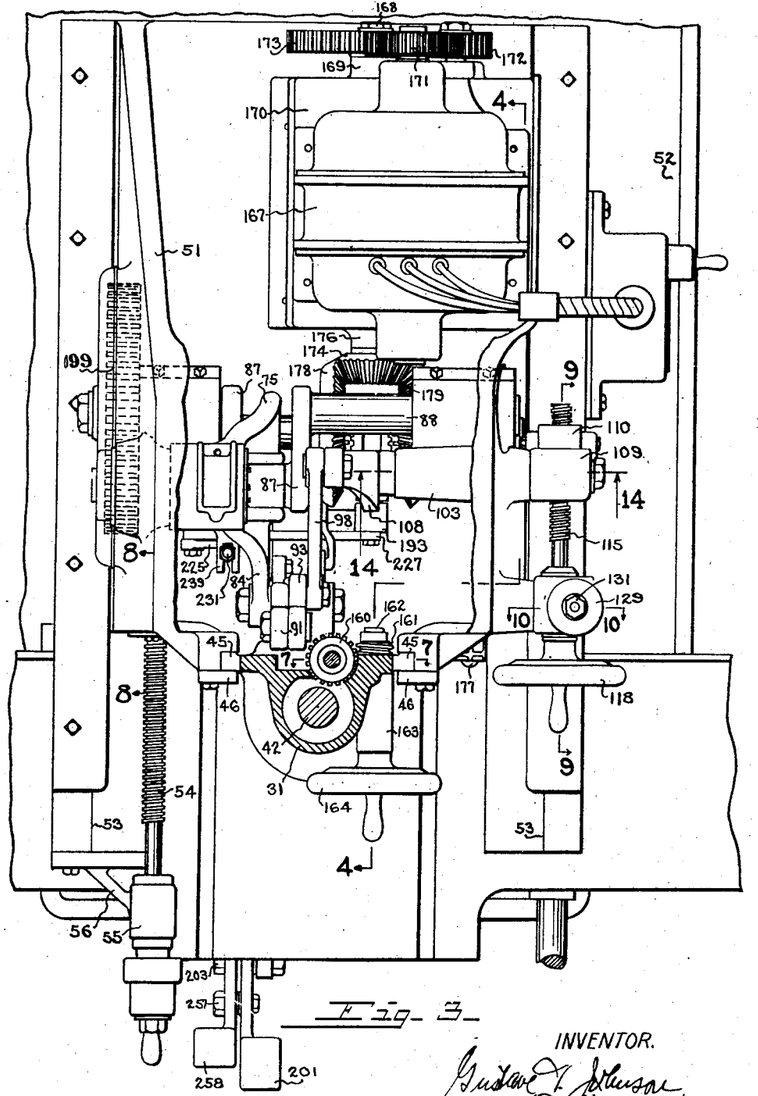
Fig. 3 is a plan view of the same, partly broken away.

The work to be operated on is exemplified as a timber 60, shown in dotted lines in Figs. 1 and 2, the work being arranged to be located upon a table 61 to which it may be suitably secured in usual manner, the table having movement in a guideway 62 in a bracket 63, adjustable up and down on the frame on guides 64, by means of a screw 65, having threaded connection in a screw-threaded bearing 66 on the base 67 of the frame of the machine. The screw is turned by means of a hand-wheel 68 fixed to the same.

Endwise movement is imparted to the table by means of a hand-wheel 70 fixed to a shaft 71 journaled in the bracket and having a pinion 72 fast thereon, the pinion meshing with a rack 73 secured to the table. By endwise movement of the table any part in the length of work may be placed under the tool on the ram, for being operated on thereby, and by adjustment of the supplemental frame on the main frame, the tool may be placed in any position crosswise of the work, so that any point on the work may be reached by the tool.

The ram is arranged to have endwise movements imparted thereto for feeding movements of the tool into and out of the work, instanced as effected by linkage and lever means arranged to be readily adjusted for adjusting the length of stroke of the ram, and instanced as also provided with adjusting means for adjusting the position of said stroke.

An arm 75 has a bearing 76, pivoted on a stud-shaft 77 located in a bearing 78 of the frame, and held axially in said bearing, the arm 75 being held on said stud-shaft by a plate 79 fixed to said shaft by bolts 80. (See Figs. 3, 4, 5 and 6.)

This arm is provided with a slot 81 forming a guide 82 in which a crank-block 83 has slide connection. Webs 84, 85, extend from the guide. The crank-block is on a crank pin 86, between crank-arms 87 of a crank-shaft 88, journaled in bearings 89 of the frame. (See Figs. 3, 4, 5, 6 and 13.) The construction is such that the arm 75 is moved back and forth on its pivot, shown as a pendulum movement.

A link 91 is articulated with the arm, as by a bolt 92. A link 93 is articulated with the ram, as by a bolt 94, received through a lug 95 of said ram. The articulations mentioned with said links are at one of the ends of said links, the other ends of said links being articulated together, as by a bolt 96. These links are, when in retracted position, preferably parallel with each other and with the guides 45, the link 91 being behind the link 93 in Figs. 4 and 6, but shown in dotted lines in Fig. 6, and shown in full lines in Figs. 3, 4 and 13.

The ends of the links which are articulated together are controlled by a link 98, which is articulated with a lug 99 of one of said links, as by an articulating bolt 100, at one of the ends of said link 98, the other end of said link 98 being articulated with a lever 101, which is pivoted by a shaft 102, rocking in a bearing 103 in the frame. The last-named articulation may be by an articulating bolt 104. The lever 101 comprises an arm 108 connected to said shaft at one side of the bearing 103 and an arm 109 keyed to the shaft at the other side of said bearing. The arm 109 is shown in the form of a fork, in which there is a nut 110, in the form of a block pivoted to the fork on bolts 111. A screw-rod 115 is threaded in said nut, and is journaled in and held in endwise relation to a bearing 116, on a bracket 117, extending from the supplemental frame. (See Figs. 2, 3 and 9.) This shaft has a hand-wheel 118 thereon for turning the same. The turning of the hand-wheel in one direction will swing the lever 101 so as to cause the articulating axis (see Fig. 6), of the articulating bolt 96 to approach the axis of oscillation of the arm 75, whereby the interarticulated ends of the links 91, 93, are caused to approach said axis of oscillation, whereby the stroke or path of reciprocation of the tool-ram is shortened. Rotation of the hand-wheel 118 in the opposite direction will cause adjustment of said lever in the opposite direction for adjusting said axis of articulation 96 to greater distance from said axis of oscillation 77, for increasing the stroke or path of reciprocation of the tool-ram.

Figure 6:
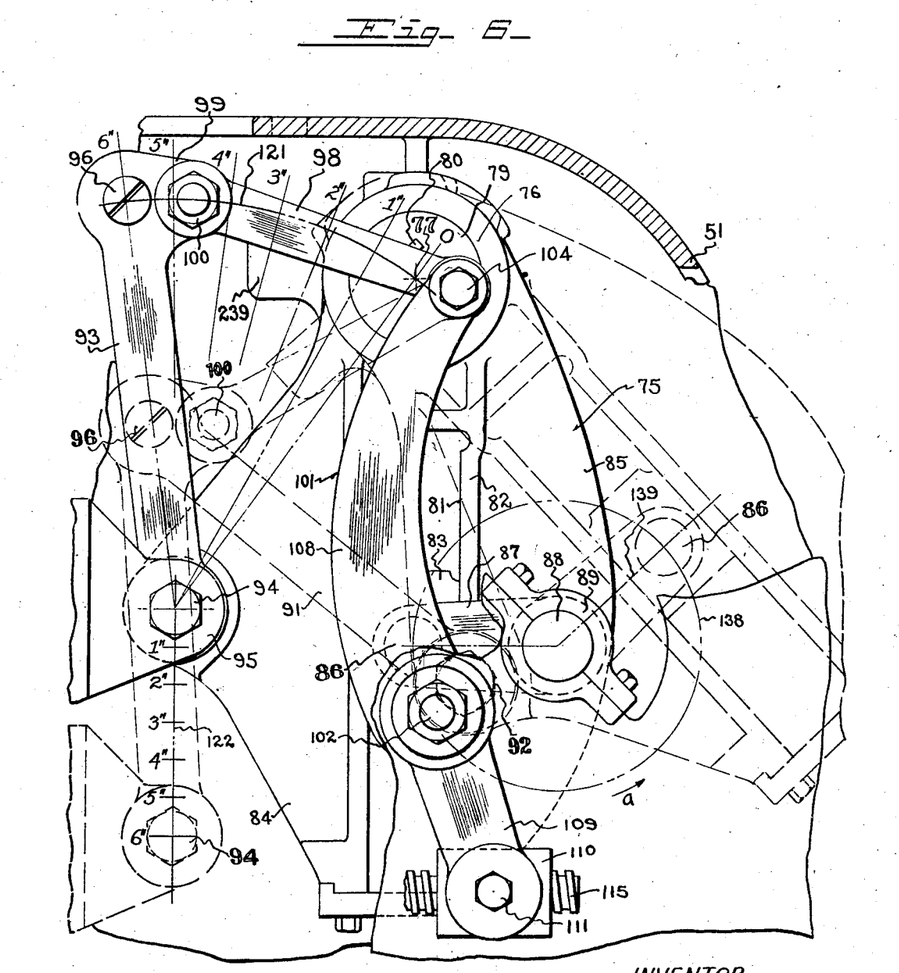
Fig. 6 is a side elevation of the crank and link mechanism for causing axial movement of the tool, shown in retracted position in full lines and in operated position in dotted lines, and having adjustments indicated thereon, parts being partly broken away.

I have in Fig. 6 instanced such adjustments on the arc 121, described from the axis of articulation 94 of the link 93 with the tool-ram as a center, noting the adjustments on said arc as from 1 to 6 inches, inclusive, it being understood that adjustments of minor or other denominations can also be made.

I have also in said figure instanced the corresponding strokes or lengths of path of reciprocation of the tool-ram by the graduations of from 1 to 6 inches inclusive on a right line 122, parallel with the path of the tool-ram. These respective measurements correspond with the coordinate indications on the arc 121, it being understood that the corresponding strokes of the ram may also be subdivided according to the adjustments of the lever 101.

These adjustments may, if desired, be very minute and accurate. In order that such adjustments may be accurately indicated in convenient manner for the operator, whose position is at the front of the machine, I provide the screw-rod 115 with a worm 124, which meshes with a worm-wheel 125, on a shaft 126, journaled in bearings 127, 128, in the bracket 117, the shaft 126 having a head 129 fixed thereto, as by being clamped between a shoulder 130 on said shaft and a nut 131 received over the threaded end 132 of said shaft. (See Figs. 1, 9 and 10.) This head has a scale 133 thereon, the markings on which are arranged to coincide with a pointer 134 on an enlargement 135 of said bearing. The adjustment for depth of stroke of the tool-ram may be made during operation of the machine and during reciprocation of the ram.

Referring to Fig. 6, it is assumed that the path of the axis of the crank-pin is coincident with the dot and dash line 138. The normal position of said crank-pin and its crank-arm is shown by the full lines of said crank-arm 87 in said figure. The normal position of the crank-pin 86 is shown in said figure at the left of the crank-shaft 88. The normal rotation of said arm and its crank-pin is preferably in the direction of the arrow a. During such rotation, the crank-pin moves the arm 75 with it, from the position shown in full lines to the position shown in dotted lines in said figure, representing the limits of movement of said arm, the crank and crank-pin in the position for farthest movement of said arm for in-feeding movement of the ram being shown in dotted lines in said figure.

In this manner the crank-pin passes throughout the greater portion of its circle of movement, represented by the sector or obtuse angle 139 during the movement of the tool into the work, exemplified as a slower movement, whereas the return stroke of the tool-ram takes place while the crank-pin moves from its dotted position at the right and higher than the crank-shaft 88 to its dotted position at the left of said crank-shaft shown in said figure, traversing the shorter sector of said circle or angle of movement of the crank-pin, so that the return stroke of the tool-ram takes place with a quicker movement. This results in having a slower feeding movement of the tool into the work, when it is performing its cutting function, than the quicker return of the tool out of the work, which is usually an idle movement.

During the movement of the arm 75, the axis of articulation 92 of said arm with the the link 91, as shown in Fig. 6, moves from its full line position to its dotted line position, the said link then assuming the position shown in dotted lines in said figure, whereby the link 93 is also moved from the position shown in full lines to the dotted position of said link shown in said figure. As a result, the axis of the articulation 94 of the link 93 with the tool-ram has movement in a line parallel with the guide of said tool-ram along a right line, indicated by the dot and dash line 122 in said Fig. 6, whereby the link 98 is moved from the position shown in full lines to its position indicated in dotted lines shown in said figure.

The figure assumes the parts adjusted for a maximum stroke, represented as six inches. Any less length of stroke may be effected by adjustment of the lever 101, so as to cause approach between the axis of articulation 96 and the axis of oscillation 77 of the arm 75. The nearer said axis of articulation is caused to approach said axis of oscillation, the shorter will be the resultant stroke of the tool-ram. If the axis of articulation and the axis of oscillation are coincident, then the stroke of the tool-ram will be nil.

The weight of the ram is preferably counter-balanced, accomplished in the present instance by a spring 141 having attachment with the supplemental frame at one end, as with a lug 142, and with a link 143 by means of a bolt 144 at its other end. (See Figs. 4 and 5.) The link has articulation 145 with a lever 146 pivoted on a pin 147 in bearings 148 of hangers 149 depending from the supplemental frame. A link 150 has articulation with said lever by a pin 151 and by a pin 152 with a lug 153 on the articulating lug 95 of the tool-ram.

The articulating lug 95 is located on a block 154 having a threaded bore 155, in which a screw-rod 156 is threaded. (See Figs. 7 and 13.) The screw-rod is journaled in step-bearings 157, 158, on a web 159 of the ram, and has a worm-wheel 160 secured thereto. A worm 161 meshes with the worm-wheel and is fixed to a shaft 162 journaled in a bearing 163, in which it is held endwise, and having a hand-wheel 164 secured thereto. The rotation of the hand-wheel causes rotation of the screw, whereby the tool-ram is moved up or down on the block, resulting in positioning the tool on the ram axially, for adjusting the position of operation of the tool.

By means of these adjustments, the length of stroke or path of the tool may be adjusted, and the position in which said path lies may also be adjusted, for adjusting respectively the depths of holes which the tool shall make, and the positions at which said holes shall be made.

Thus, exemplifying the tool as operating on a timber 60 of a given thickness, the position of the tool-ram may be adjusted so that when the tool is out of the work, exemplified as an up-position, the end of the tool may just clear the work, so that the timber may be moved lengthwise under the tool. The adjustment for depth of cut may be such, for instance, that a hole or mortise of two inches in depth may be made, of desirable length according to the feeding movements imparted to the timber. This may be followed by a mortise of a depth of six inches, feeding movements of the timber taking place to determine the length of said second mortise.

The feeding movements of the timber take place when the tool is at its upward limit of movement, that is, out of the work, the retracting movement of the tool being to the same position regardless of the depth of the preceding mortise. Other mortises of various depths may also be made in the same timber. The positions of the mortises may be lengthwise of the timber, by the feeding movements imparted to the table, and may be at different points across the timber according to the adjustments of the supplemental frame on the main frame.

If it is next desired to mortise a thinner timber, adjustment of the tool-ram on its articulating block is made, for causing the tool-ram to approach the work, exemplified as a downward adjustment, in which position the movements previously explained for making the holes or mortises may be repeated.

Rotation may be imparted to the crank-shaft 88 by means of an electric motor 167 secured to the supplemental frame. (See Figs. 2 and 3.) The motor rotates a shaft 168, journaled in a bearing 169 of a gear-box 170 on the supplemental frame, by means of a train of gears 171, 172, 173, the former of which is fixed to the armature shaft of the electric motor and the latter of which is fixed to the shaft 168.

Figures 14, 15:
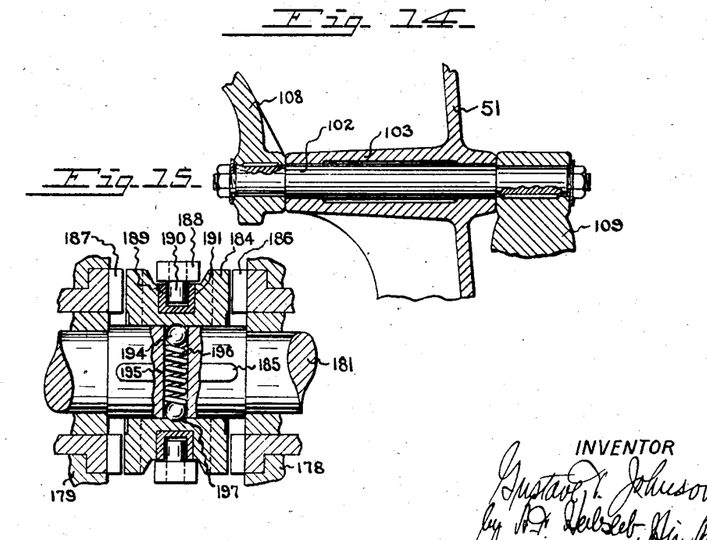
Fig. 14 is a detail, taken in section on the line 14—14 of Fig. 3, showing the means for pivoting the link adjusting lever.
Fig. 15 is a detail taken in cross-section on the line 15—15 of Fig. 4, showing an axial section of the clutches.

A bevel-gear 174 is fixed to a shaft 175 (see Fig. 16), journaled in a bearing 176 on said gear-box, suitable speed-changing gears being located in the gear-box for transmitting various speeds from the shaft 168 to the shaft 175, in order to vary the number of strokes per minute of the tool-ram. Shifting of the speed-changing gears is accomplished by a shifting lever 177 at the operator's position. (See Fig. 1.) The electric motor is mounted on the gear-box. The bevel-gear 174 meshes with bevel-gears 178, 179, which it rotates in opposite directions. (See Figs. 3 and 16.) The bevel-gears 178, 179, are loosely rotatable about a shaft 181, journaled in bearings 182, 183, of the supplemental frame. A clutch-collar 184 has spline-key and groove connection 185 with said shaft, clutches 186, 187, being located between said clutch-collar and said last-named bevel-gears, shown as tooth clutches, the complemental teeth of which are respectively on opposite ends of said collar and on said bevel-gears. (See Figs. 5, 15 and 16.) A fork 188 is provided with rollers 189 on pins 190 on said fork, the rollers being received in an annular groove 191 in said collar.

The fork is secured to a rock-shaft 193. Rocking of the rock-shaft in one or the other direction causes engagement of one or the other of said clutches, for connecting the power from either of said bevel-gears 178, 179, with said shaft. The normal positions of said clutches, that is, inactive relation in said clutches, is induced by balls 194, in a bore 195 of said shaft, pressed outwardly by a spring 196 in said bore into registry with sockets 197 in the bore of said clutch-collar.

A pinion 198 is secured to the shaft 181, and meshes with a gear 199 fixed to the crank-shaft 88 for rotating the latter. (See Fig. 5.)

The means for engaging the clutch 187 is exemplified as a treadle 201, located on a treadle-lever 202, pivoted at 203 on a lug 204 secured to the base of the machine and having articulation at 205 with a link 206. (See Figs. 1, 2, 3, 11, 12 and 16.) This link is shown arranged to be adjusted in length by having a turn-buckle 207 threaded over the respective adjacent threaded ends of the link-sections composing the link. This link is articulated at 209 with a bell-crank lever 210, pivoted to the main frame at 211, and having an arm 212 with which said link is articulated, and an arm 213 with which a link 214 is articulated at 215.

The link 214 is articulated at 217 with an arm 218, having spline-key and groove connection 219 with a rock-shaft 220, journaled in a fork 221 secured to the main frame, and in bearings 222, 223, secured to the supplemental frame. This construction is for the purpose of maintaining the link connection with said rock-shaft throughout adjustments of the supplemental frame on the main frame.

A bell-crank lever 225 is fixed to said rock-shaft so as to rock therewith, and has an arm 226, with which a link 227 is articulated at 228, said link being also articulated at 229 with an arm 230 fixed to the rock-shaft 193, to which the fork 188 for shifting the clutch-collar is also secured. (See Figs. 16, 17 and 18.)

A rod 231 is articulated to the arm 232 of the bell-crank lever 225, such articulation being shown as a bolt. This rod is provided with a threaded portion 235, to which a pair of nuts 236, 237, are threaded for forming an adjustable contact-part, one of said nuts acting as a jam-nut. The upper end of said link has guide connection in a hole 238 in the supplemental frame.

The rocker-arm 75 is provided with a fork 239 received about said rod and is arranged to engage said contact-part for moving said rod and thereby disengaging the clutch. (See Figs. 4, 17 and 18.)

Figures 16, 17, 18, 19, 20:
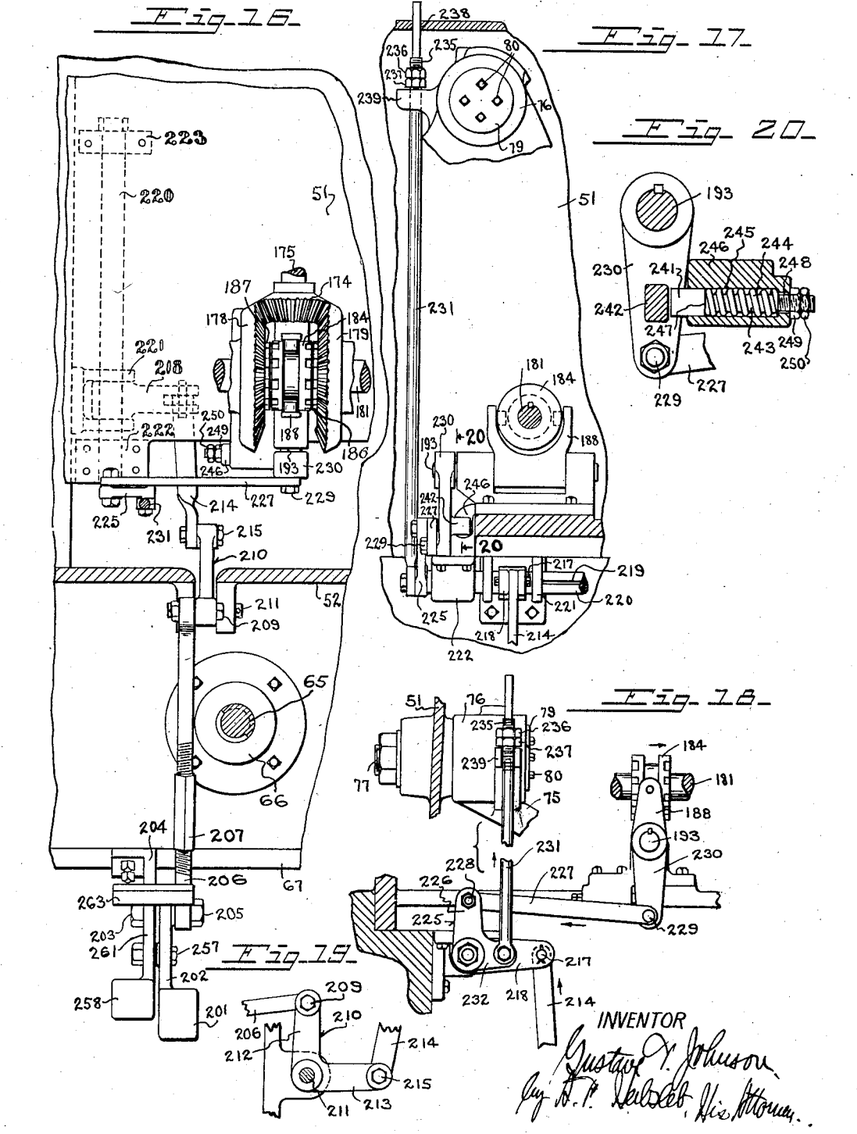
Fig. 16 is a plan view of the treadle mechanism, partly in section on the line 16—16 of Fig. 4, and showing the clutches and connected parts in plan view.
Fig. 17 is a side elevation of the same, partly broken away.
Fig. 18 is a front elevation of the same, partly broken away.
Fig. 19 is a detail in cross-section taken on the line 19—19 of Fig. 1.
Fig. 20 is a detail of the automatic clutch release mechanism, taken on the line 20—20 of Fig. 17.

During ordinary operation of the machine, the clutch 187 is engaged by depression of the treadle 201 by the operator, which causes movement of the links and clutch-collar in the directions of the arrows shown in Fig. 18. Reciprocating feeding motions are imparted to the ram as long as said treadle remains in depressed position.

When the operator releases said treadle, the clutch will automatically return to release relation, induced, for instance, by a plug 241 acting on a lug 242 on the arm 230, which forms part of the fork-lever which actuates the clutch-collar. The plug 241 is on a stem 243, which has a spring 244 surrounding it, the spring and plug being located in a bore 245 in a lug 246 on the supplemental frame. The spring is located between a shoulder 247 on said plug and the bottom of said bore, for normally urging said plug toward said lever-arm. The stem 243 extends through a hole 248 in the bottom of said bore, and is threaded for receiving an adjusting nut 249 and a jam-nut 250, whereby the movement of said plug toward said lever-arm is adjusted, so that the movement imparted to the clutch-lever toward normal or release relation will be just sufficient to cause engagement between the balls 194 in the clutch-shaft with the sockets 197 in the clutch-collar.

The clutch 187 may be maintained in engaged relation for repeated feeding movements of the tool, by means of a latch-lever 253, provided with a latch 254, arranged to engage with a catch 255 on the lug 256, for maintaining the treadle 201 in depressed relation. The latch-lever is pivoted to the treadle-lever on a pivot-bolt 257. The latch-lever is provided with a treadle 258 for depressing the same so as to engage the latch, the operator placing his foot on both treadles 201, 258, and depressing both levers, when it is desired to engage the latch for maintaining the treadle 201 in depressed relation for automatic repeated feeding movements of the tool. The operator depresses the treadle 201 for releasing the latch, the latch-lever normally retracting by gravity. (See Figs. 11 and 12.)

The latch-lever is provided with an extension 261 normally resting on a lug 262 on the treadle-lever 202. This extension is provided with a treadle 263, by means of which the treadle lever 202 may be moved in the opposite direction for engagement of the clutch 186, whereby the crank-shaft 88 is rotated in reverse direction. This results in swinging of the arm 75 by means of an opposite rotation of the crank-pin.

This construction and arrangement of parts is employed principally in emergencies, for instance, if the feeding of the tool into the work should for any reason be blocked or be hard on account of condition of tool or work, and it is desired to move the tool out of the work prior to completion of its feeding stroke, or it should be desired to accomplish a single feeding stroke by repeated feeding and reverse movements of the tool.

During ordinary operation of the machine, the treadle 201 is depressed, for moving the levers and links in the directions of the arrows in Fig. 18, and causing repeated reciprocations of the tool-ram for cutting the mortises. By such depression of the treadle 201, the nuts 236, 237 (see Fig. 17) are raised away from the fork 239.

If, however, the tool should become stuck in the work, or it should be desired for any reason to withdraw the tool from the work by a backward movement, that is, prior to completion of its stroke into the work, then the treadle 263 is depressed, which will move the links and levers in a direction opposite to the directions of the arrows in Fig. 18.

It will be understood that when the tool is in the work, the fork 239 has been moved away from the normal positions of the nuts 236, 237, shown in Fig. 17, thus enabling the rod 231 to be depressed for engaging the reversing clutch 186. When now the backing of the tool out of the work is effected, the fork 239 will also have been raised into contact with the nut 237, for raising the rod 231, and thereby disengaging the clutch 186 automatically.

This insures that only one reverse or backing-out stroke of the tool-ram shall take place at any one time, the clutch 186 being disengaged at each such reverse stroke. This is for the purpose of preventing an operator from operating the machine with reverse strokes, during which feeding movement of the tool into the work would be a quick movement, as it would take place during the movement of the crank throughout the shorter arc of its path of rotation, being a relatively quick movement, and the withdrawal of the tool would be during the travel of said axis of the crank throughout the greater arc or angle of its path, which would be its slower movement. The backing-out movement of the tool is therefore effected during the slower movement of the crank, for making the backing out movement more effective.

Having thus fully described my invention what I claim as new, and desire to secure by Letters Patent, is:

1. In a hollow-chisel mortising machine, the combination of a frame, a hollow-chisel ram thereon including an auger-spindle journaled on said ram, a power-driven vibratory arm at the side of said ram, a pair of links having an articulation between them, said pair of links respectively having articulation with said ram and with said power-driven vibratory arm, said last-named articulations being normally spaced from said first-named articulation, a rotating crank at the side of said ram reciprocating said vibratory arm by movements in directions lateral with relation to said ram, and an additional link having articulation with said pair of links in adjacency to said first-named articulation and having an articulation spaced therefrom.

2. In a hollow-chisel mortising machine, the combination of a frame, a hollow-chisel ram thereon including an auger-spindle journaled on said ram, a power-driven vibratory arm at the side of said ram, a pair of links having an articulation between them, said pair of links respectively having articulations with said ram and with said power-driven vibratory arm, said last-named articulations being normally spaced from said first-named articulation, a rotating crank at the side of said ram reciprocating said vibratory arm by movements in directions lateral with relation to said ram, an additional link having articulation with said pair of links in adjacency to said first-named articulation and having an articulation spaced therefrom, and means for adjusting said last-named articulation.

3. In a hollow-chisel mortising machine, the combination of a frame, a hollow-chisel ram thereon including an auger-spindle journaled on said ram, a power-driven pivoted arm, a pair of links having an articulation between them, said pair of links respectively having articulations with said ram and with said power-driven pivoted arm, said last-named articulations being normally spaced from said first-named articulation, a rotating crank at the side of said pivoted arm reciprocating said pivoted arm by movements in directions lateral with relation to said ram, and an additional link having articulation with said pair of links in adjacency to said first-named articulation and having an articulation spaced therefrom, the pivotal axis of said arm and the axis of rotation of said crank being respectively located in planes proximate to the planes perpendicular to the path of said ram in which said first-named articulation and said articulation of said pair of links with said pivoted arm are respectively located.

4. In a hollow-chisel mortising machine, the combination of a frame, a hollow-chisel ram thereon including an auger-spindle journaled on said ram, a pivoted arm at the side of said ram, a pair of links having an articulation between them, said pair of links respectively having articulation with said ram and said pivoted arm, said last-named articulations spaced from said first-named articulation, a rotating crank at the side of said ram reciprocating said pivoted arm by movements in directions lateral with relation to said ram, an additional link having articulation with said links in adjacency to said first-named articulation and a normally stationary articulation spaced therefrom, means for adjusting said last-named articulation whereby to move said first-named articulation toward and from the pivotal axis of said pivoted arm, and an indicating means having driven connection with said last-named means and located close to the operator's position whereby to indicate to the operator the adjustment made by said adjusting means during adjustment.

5. In a hollow-chisel mortising machine, the combination of a frame, a hollow-chisel ram thereon including an auger-spindle journaled on said ram, a right line guide therefor, an oscillating arm at the side of said ram, a counterbalancing means, a pair of links substantially parallel with said guide having articulations at one of their ends respectively with said arm and said ram and having interarticulation between them at the other end of said links, said links normally extending in one direction from said block, a lever, a link between the interarticulated ends of said pair of links and said lever, means for adjusting said lever comprising an operating handle, and indicating means comprising a movable indicating element having driven connection with said handle, said handle and said driven indicating element being close to the operator's position whereby to adjust the distance between said interarticulation and the axis of oscillation of said pivoted arm.

6. In a hollow-chisel mortising machine, the combination of a frame, a hollow-chisel ram thereon including an auger-spindle journaled on said ram, a right line guide therefor, an articulating block, means for adjusting said ram on said articulating block, an oscillating arm at the side of said ram, a counterbalancing means, a pair of links substantially parallel with said guide having articulations at one of their ends respectively with said arm and said articulating block and having interarticulation between them at the other end of said links, said links normally extending in one direction from said block, a link extending in opposite direction from said articulating block and having connection with said counterbalancing means, a lever, a link between the interarticulated ends of said pair of links and said lever, a shaft for adjusting said lever, an indicator dial having driven connection with said shaft, and a hand-wheel for rotating said shaft, said hand-wheel and dial being close to the operator's position, whereby to adjust the distance between said interarticulation and the axis of oscillation of said arm during reciprocation of said ram.

7. In a hollow-chisel mortising machine, the combination of a main frame, a supplemental frame thereon, a guide between said supplemental frame and said main frame, a hollow-chisel ram including an auger-spindle journaled in said ram, a right line guide on said supplemental frame for said ram, a lever, a vibratory arm, a pair of links normally substantially parallel with said guide, said links having interarticulation at one of their ends, articulations between said links and said ram and said vibratory arm at the other end of said links, an additional link having articulation with the interarticulated ends of said pair of links, said last-named link having articulation at its other end with said lever, a shaft for adjusting said lever, whereby to adjust said interarticulation toward and from the axis of vibration of said arm, an indicating scale, micrometer driving means between said shaft and said indicating scale, a table for work, a guide support therefor, a shaft for adjusting said supplemental frame crosswise of said table, a shaft for moving said table on said guide crosswise of said frames, said machine having an operator's position in front of said table, and operating means on said respective shafts at said operator's position.

8. In a hollow-chisel mortising machine, the combination of a frame, a hollow-chisel ram thereon including an auger-spindle journaled on said ram, a guide therefor, an arm pivoted on said frame, a pair of links having an articulation between them, an additional link having articulation with said pair of links in adjacency to said first-named articulation and a relatively stationary articulation, said pair of links respectively having articulations with said ram and with said arm, said last-named articulations spaced from said first-named articulation, a crank for vibrating said arm, means for rotating said crank in a given direction whereby to feed the tool into the work, means for rotating the crank in the opposite direction for backing out said tool from the work, and means automatically interfering with repeated rotations of said crank in said opposite direction.

9. In a hollow-chisel mortising machine, the combination of a frame, a hollow-chisel ram thereon including an auger-spindle journaled on said ram, a guide therefor, an arm pivoted on said frame, a pair of links having an articulation between them, an additional link having articulation with said pair of links in adjacency to said first-named articulation and a relatively stationary articulation, said pair of links respectively having articulation with said ram and with said arm, said last-named articulations spaced from said first-named articulation, a crank for vibrating said arm, a clutch for rotating said crank whereby to feed said tool into the work, a reverse clutch for rotating the crank in the opposite direction for backing out said tool from the work, and means for automatically disengaging said last-named clutch.

10. In a hollow-chisel mortising machine, the combination of a frame, a hollow-chisel ram thereon including an auger-spindle journaled on said ram, a guide therefor, an arm pivoted on said frame, a pair of links having an articulation between them, an additional link having articulation with said pair of links in adjacency to said first-named articulation and a relatively stationary articulation, said pair of links respectively having articulation with said ram and with said arm, said last-named articulations spaced from said first-named articulation, a crank for vibrating said arm, a clutch for rotating said crank whereby to feed said tool into the work, a reverse clutch for rotating said crank in the opposite direction for backing out said tool from the work, said clutches comprising a movable member, means for reversely moving said movable member, a rod extending therefrom, and an automatic stop between said rod and said arm.

11. In a hollow-chisel mortising machine, the combination of a frame, a hollow-chisel ram thereon including an auger-spindle journaled on said ram, a power driven reciprocating element, a pair of links having articulation between them, said pair of links have an articulation with said ram and with said power driven reciprocating element, said last-named articulations being spaced from said first-named articulation, an additional link having articulation with said pair of links in adjacency to said first-named articulation and having an articulation spaced therefrom, means for reciprocating said reciprocating element comprising a clutch, said clutch comprising a reverse causing member, a treadle-lever having an intermediate pivot, a treadle at each end of said lever, and link and lever mechanism between said treadle lever and said reverse causing member for operating the latter in either direction.

12. In a hollow-chisel mortising machine, the combination of a frame, a hollow-chisel ram thereon including an auger-spindle journaled on said ram, a power driven reciprocating element, a pair of links having articulation between them, said pair of links have an articulation with said ram and with said power driven reciprocating element, said last-named articulations being spaced from said first-named articulation and an additional link having articulation with said pair of links adjacent to said first-named articulation and having an articulation spaced therefrom, means for reciprocating said reciprocating element comprising a clutch, said clutch comprising a reversely movable member, a treadle-lever having an intermediate pivot, a treadle-lever having an intermediate pivot on said first-named treadle-lever, a treadle at each end of said last-named lever, a latch for said last-named treadle-lever and a stop between said treadle-levers at the respective sides of said last-named pivot, and link and lever mechanism between said first-named treadle-lever and said movable member, constructed and arranged for operating the latter in either direction.

13. In a hollow-chisel mortising machine, the combination of a main frame, a supplemental frame, a cross-guide between said supplemental frame and said main frame, means for adjusting said supplemental frame on said main frame in said guide, a hollow-chisel ram on said supplemental frame including an auger-spindle journaled on said ram, an arm pivoted on said supplemental frame, a pair of links having an articulation between them, an additional link having articulation with said pair of links in adjacency to said first-named articulation and a relatively stationary articulation, said pair of links respectively having articulation with said ram and with said arm, said last-named articulations spaced from said first-named articulation, a crank at the side of said ram for reciprocating said arm, means for driving said crank comprising a clutch, a treadle-lever pivoted to said main frame, and a bell-crank lever between said treadle-lever and said clutch comprising a pair of arms and a shaft arranged for rocking together and for having axial movement between them lengthwise of said shaft for accommodating the adjustments between said supplemental frame and said main frame.

14. In a hollow-chisel mortising machine, the combination of a frame, a hollow-chisel ram thereon including an auger-spindle journaled on said ram, a vibratory arm at the side of said ram, a link having articulation adjacent one of its ends with said ram, the other end of said link having an articulation with said vibratory arm, means for adjusting said last-named articulation on an arc described from the axis of said first-named articulation as a center and bisecting the pivotal axis of said vibratory arm, a crank in side relation to said ram for operating said vibratory arm, a clutch for rotating said crank whereby to feed the tool into the work, a reversing clutch for rotating said crank in opposite direction for backing out said tool from the work, and means for automatically disengaging said last-named clutch at each rotation of said crank.

15. In a hollow chisel mortising machine, the combination of a frame, a hollow-chisel ram thereon including an auger-spindle journaled on said ram, a vibratory arm at the side of said ram, a pair of links, one of said links having articulation with said vibratory arm, the other of said links having articulation with said ram, and said links having articulation between them spaced from said first-named articulations, means for adjusting said last-named articulation on an arc described substantially from the axis of said first-named articulation as a center and substantially bisecting the pivotal axis of said vibratory arm, a crank in side relation to said ram for operating said vibratory arm, means for rotating said crank in a given direction, means for rotating said crank in the opposite direction for backing out the tool on said ram from the work, and means for automatically interrupting said last-named means at each rotation of said crank.

In testimony whereof, I have hereunto signed my name.

GUSTAVE T. JOHNSON.